United States Patent
Robitzsch et al.

(10) Patent No.: US 11,646,993 B2
(45) Date of Patent: May 9, 2023

(54) SYSTEM AND METHOD TO REGISTER FQDN-BASED IP SERVICE ENDPOINTS AT NETWORK ATTACHMENT POINTS

(71) Applicant: INTERDIGITAL PATENT HOLDINGS, INC., Wilmington, DE (US)

(72) Inventors: Sebastian Robitzsch, London (GB); Dirk Trossen, London (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 54 days.

(21) Appl. No.: 16/467,427

(22) PCT Filed: Dec. 14, 2017

(86) PCT No.: PCT/US2017/066434
§ 371 (c)(1),
(2) Date: Jun. 6, 2019

(87) PCT Pub. No.: WO2018/112212
PCT Pub. Date: Jun. 21, 2018

(65) Prior Publication Data
US 2020/0076764 A1    Mar. 5, 2020

Related U.S. Application Data

(60) Provisional application No. 62/434,181, filed on Dec. 14, 2016.

(51) Int. Cl.
*H04L 61/4511* (2022.01)
*H04L 65/1016* (2022.01)
(Continued)

(52) U.S. Cl.
CPC ...... *H04L 61/4511* (2022.05); *H04L 61/5076* (2022.05); *H04L 65/1016* (2013.01); *H04L 67/02* (2013.01); *H04L 67/568* (2022.05)

(58) Field of Classification Search
CPC . H04L 67/2842; H04L 65/1016; H04L 67/16; H04L 61/2076; H04L 67/02;
(Continued)

(56) References Cited

U.S. PATENT DOCUMENTS 8,559,434 B2    10/2013    Esteve Rothenberg
9,736,185 B1 *    8/2017    Belamaric ............... H04L 63/20
(Continued)

FOREIGN PATENT DOCUMENTS

CN    103581019 A    2/2014
CN    103812767 A    5/2014
(Continued)

OTHER PUBLICATIONS

Sarantorn Bisalbutra: "Publish/Subscribe Gateway for Real-time Communication", Nov. 19, 2012 (Nov. 19, 2012), pp. 1-83, XP055233866, Espoo, Finland (Year: 2012).*
(Continued)

*Primary Examiner* — Mehmood B. Khan
(74) *Attorney, Agent, or Firm* — Invention Mine LLC

(57) ABSTRACT

System and methods are described to register FQDN-based IP service endpoints at network attachment points. One embodiment takes the form of a method comprising: receiving, at a server-side network access point (sNAP) in an information-centric network (ICN), a registration request including a first fully qualified domain name (FQDN), a port, a transport protocol, and a service name of an IP server; publishing, at the sNAP, the port, the transport protocol, and
(Continued)

the service name to a first content identifier (CID); and subscribing, at the sNAP, to a second CID that is based on the FQDN.

18 Claims, 12 Drawing Sheets

(51) Int. Cl.
*H04L 67/02* (2022.01)
*H04L 61/5076* (2022.01)
*H04L 67/568* (2022.01)

(58) Field of Classification Search
CPC ..... H04L 61/1511; H04L 67/10; H04L 67/28; H04L 67/327
See application file for complete search history.

(56) References Cited

U.S. PATENT DOCUMENTS

| | | | |
|---|---|---|---|
| 10,034,229 B2* | 7/2018 | Zhang | H04W 40/02 |
| 2003/0172163 A1* | 9/2003 | Fujita | H04L 67/1001 709/226 |
| 2004/0246948 A1* | 12/2004 | Lee | H04L 45/04 370/254 |
| 2008/0016233 A1* | 1/2008 | Schneider | G06F 16/248 709/230 |
| 2009/0325584 A1 | 12/2009 | Pan | |
| 2010/0198922 A1* | 8/2010 | Katis | G06Q 10/00 709/206 |
| 2010/0228813 A1* | 9/2010 | Suzuki | H04L 61/4511 709/230 |
| 2010/0235471 A1* | 9/2010 | Parikh | H04L 43/20 718/1 |
| 2012/0278467 A1* | 11/2012 | Schneider | G06Q 30/02 709/223 |
| 2013/0036307 A1* | 2/2013 | Gagliano | H04L 9/321 713/171 |
| 2013/0173822 A1* | 7/2013 | Hong | H04L 45/306 709/232 |
| 2013/0275575 A1* | 10/2013 | Hugard, IV | H04W 12/128 709/224 |
| 2014/0020102 A1* | 1/2014 | Srinivasan | H04L 63/10 709/224 |
| 2014/0089478 A1* | 3/2014 | Seed | H04W 4/50 709/222 |
| 2014/0201212 A1 | 7/2014 | Qi | |
| 2015/0089061 A1* | 3/2015 | Li | H04L 61/2567 709/226 |
| 2015/0100507 A1* | 4/2015 | Levac | G06Q 50/184 705/310 |
| 2015/0381756 A1* | 12/2015 | Lotfallah | H04L 67/568 709/213 |
| 2017/0019371 A1* | 1/2017 | Osterweil | H04L 61/58 |
| 2017/0063969 A1* | 3/2017 | Franks | H04W 4/80 |
| 2017/0237660 A1 | 8/2017 | Trossen | |
| 2019/0074982 A1* | 3/2019 | Hughes | H04L 9/0863 |
| 2019/0104032 A1 | 4/2019 | Du et al. | |
| 2022/0058267 A1* | 2/2022 | Chow | G06Q 30/0282 |

FOREIGN PATENT DOCUMENTS

| | | | |
|---|---|---|---|
| EP | 2611111 | 7/2013 | |
| EP | 2958281 A1 | 12/2015 | |
| WO | WO-2013088323 A2 * | 6/2013 | H04L 12/189 |
| WO | WO-2015021073 A2 * | 2/2015 | H04L 51/36 |
| WO | 2016033487 | 3/2016 | |
| WO | 2016061243 A1 | 4/2016 | |
| WO | 2016123516 | 8/2016 | |
| WO | 2016123516 A1 | 8/2016 | |
| WO | 2016168009 A1 | 10/2016 | |
| WO | 2016201395 | 12/2016 | |
| WO | 2016201411 A1 | 12/2016 | |
| WO | 2017004508 | 1/2017 | |
| WO | WO-2017007783 A1 * | 1/2017 | H04L 61/1511 |
| WO | 2017058653 | 4/2017 | |
| WO | WO-2020224748 A1 * | 11/2020 | H04L 61/1511 |

OTHER PUBLICATIONS

Sarantorn Bisalbutra: "Publish/Subscribe Gateway for Real-time Communication", Nov. 19, 2012 (Nov. 19, 2012), pp. 1-83, XP055233866 (Year: 2012).*
IEEE, "IEEE Standard for Local and Metropolitan Area Networks: Overview and Architecture". IEEE Computer Society, IEEE Standard 802 (2014), 74 pages.
IEEE, "IEEE Standard for Information technology—Telecommunications and information exchange between systems. Local and metropolitan area networks—Specific requirements. Part 11: Wireless LAN Medium Access Control (MAC) and Physical Layer (PHY) Specifications". IEEE Computer Society, IEEE Standard 802.11 (2012), pp. 573-578, pp. 659-661, and p. 1136.
Trossen, D., et. al., "Designing and Realizing an Information-Centric Internet". IEEE Communications Magazine, vol. 50, No. 7, Jul. 2012, pp. 60-67.
International Search Report and Written Opinion of the International Searching Authority for PCT/US2017/025125 dated Jun. 9, 2017, 16 pages.
Kutscher, D., "Multicast in Information-Centric Networking". SAMRG, IETF83, available online at: www.ietf.org/proceedings/83/slides/slides-83-samrg-1, Mar. 2012, 22 pages.
Pentikousis, K., et. al., "Information-Centric Networking: Evaluation and Security Considerations; draft-irtf-icnrg-evaluation-methodology-04". ICNRG Internet-Draft, Intended Status: Informational, available online at: https://tools.ietf.org/html/draft-irtf-icnrg-evaluation-methodology-04, Mar. 11, 2016, pp. 1-34.
Khorov, E., et. al., "A Survey on IEEE 802.11ah: An Enabling Networking Technology for Smart Cities". Computer Communications, available online at: http://dx.doi.org/10.1016/j.comcom.2014.08.008 (2014), pp. 1-17.
International Preliminary Report on Patentability for PCT/US17/25125 dated Oct. 11, 2018.
International Search Report and Written Opinion of the International Searching Authority for PCT/US2017/066434 dated Feb. 16, 2018.
Bisalbutra, S., "Publish/Subscribe Gateway for Real-time Communication". Aalto University School of Electrical Engineering, available at: http://lib.tkk.fi/Dipl/2012/urn100732.pdf, Thesis submitted on Nov. 19, 2012, 95 pages.
NDN, "Named Data Networking: Executive Summary"; available at http://named-data.net, (2014), 3 pages.
Islam, H., et. al., "Observing IoT Resources over ICN". IFIP Networking Conference (IFIP Networking) and Workshops, arXiv:1707.03394v2, Jul. 19, 2017, 8 pages.
Fotiou, N., et. al., "ICN Enabling CoAP Extensions for IP Based IoT Devices". Proceedings of the 4th ACM Conference on Information-Centric Networking, Sep. 26-28, 2017, pp. 218-219.
Al-Khalidi, M., et. al., "Point: IP Over LCN—The Better IP". Deliverable D4.1, Evaluation Plan and Initial Validation Report, Dec. 16, 2015, pp. 1-40.
Hoffman, P., et. al., "The DNS-Based Authentication of Named Entities (DANE) Transport Layer Security (TLS) Protocol: TLSA". Internet Engineering Task Force (IETF), Category: Standards Track, RFC: 6698, available online at: https://tools.ietf.org/html/rfc6698, Aug. 2012, pp. 1-37.
Jacobson, V., et. al., "Networking Named Content". CoNEXT Proceedings of the 5th International Conference on Emerging Networking Experiments and Technologies, ACM, Dec. 1-4, 2009, pp. 1-12.
Jarmoc, J. "Transitive Trust: SSL/TLS Interception Proxies". Secure Works, available at https://www.secureworks.com/research/transitive-trust, Mar. 21, 2012, 25 pages.
Jokela, P., et. al., "LIPSIN: Line Speed Publish/Subscribe Inter-Networking". ACM SIGCOMM Computer Communication Review, vol. 39, No. 4, Aug. 17-21, 2009, pp. 195-206.

(56) References Cited

OTHER PUBLICATIONS

Liang et al., "When HTTPs Meets CDN: A Case of Authentication in Delegated Service". IEEE Symposium on Security and Privacy, (2014), pp. 67-82.

Trossen, et. al., "Final Updated Architecture". PURSUIT Publish Subscribe Internet Technology FP7-INFSO-ICT-257217, Deliverable D2.5, Mar. 5, 2013.

Xylomenos et. al., "A Survey of Information-Centric Networking Research". IEEE Communications Surveys and Tutorials, vol. 16, No. 2, (2013), pp. 1-26.

Xylomenos et al., "Socket Emulation Over A Publish/Subscribe Network Architecture". Proceedings of the Future Network and Mobile Summit, (2010), pp. 1-5.

International Preliminary Report on Patentability for PCT/US2016/015713 completed on Feb. 22, 2017, 16 pages.

International Search Report and Written Opinion of the International Searching Authority for PCT/US2016/015713 dated Apr. 24, 2016, 13 pages.

Cooper, I., et. al., "Internet Web Replication & Caching Taxonomy". Network Working Group, Category: Informational, RFC: 3040, available online at: https://tool.ietf.org/html/rfc3040, Jan. 2001, pp. 1-32.

International Preliminary Report on Patentability for PCT/US2016/037121 dated Dec. 12, 2017, 7 pages.

International Search Report and Written Opinion of the International Searching Authority for PCT/US2016/037121 dated Sep. 9, 2016, 10 pages.

Corujo, D., et. al., "ICN Management Considerations; draft-corujo-icn-mgmt-05". ICNRG, Intended Status: Informational, Version: 05, Jul. 1, 2014, pp. 1-18.

Borislava, G., et. al., "On Flexible Topology Formation in Publish-Subscribe Networks". In IEEE International Conference on Communications (ICC), (2012), pp. 5883-5888.

Mockapetris, P., "Domain Names—Implementation and Specification". Network Working Group, RFC: 1035, available online at: https://tools.ietf.org/html/rfc1035, Nov. 1987, pp. 1-55.

Cotton, M., et. al., "Internet Assigned Numbers Authority (IANA) Procedures for the Management of the Service Name and Transport Protocol Port Number Registry". Internet Engineering Task Force (IETF), Category: Best Current Practice, RFC: 6335, available online at: https://tools.ietf.org/html/rfc6335, Aug. 2011, pp. 1-33.

International Preliminary Report on Patentability for PCT/US2017/066434 dated Jun. 18, 2019, 10 pages.

* cited by examiner

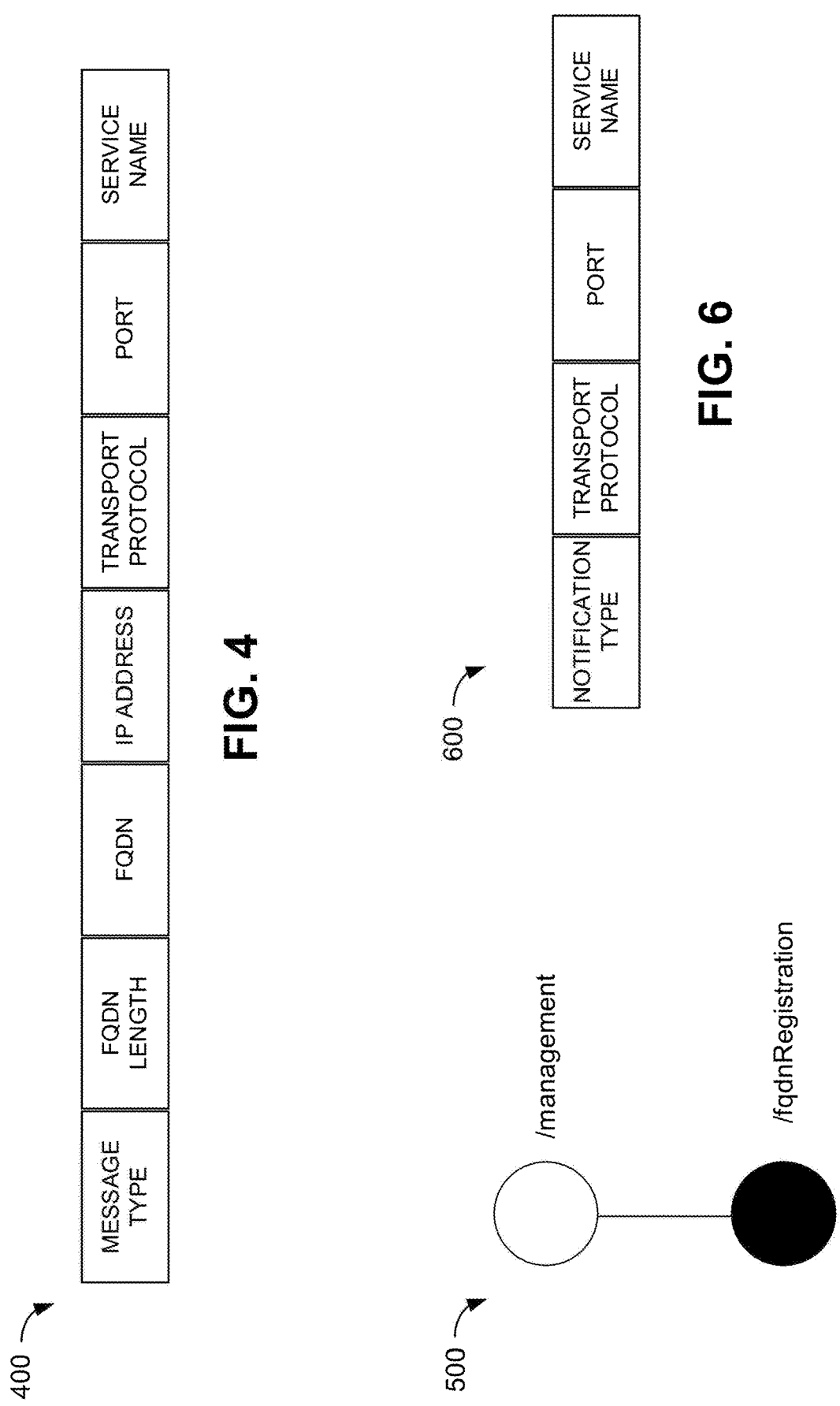

SYSTEM AND METHOD TO REGISTER FQDN-BASED IP SERVICE ENDPOINTS AT NETWORK ATTACHMENT POINTS

CROSS-REFERENCE TO RELATED APPLICATIONS

This application is a national stage application under 35 U.S.C. 371 of International Application No. PCT/US2017/066434, entitled SYSTEM AND METHOD TO REGISTER FQDN-BASED IP SERVICE ENDPOINTS AT NETWORK ATTACHMENT POINTS, filed on Dec. 14, 2017, which claims benefit under 35 U.S.C. § 119(e) from U.S. Provisional Patent Application Ser. No. 62/434,181 entitled "System and Method to Register FQDN-based IP Service Endpoints at Network Attachment Points," filed Dec. 14, 2016, which is hereby incorporated by reference in its entirety.

BACKGROUND

An Information-Centric Network (ICN) operates according to a paradigm in which content is exchanged by means of information addressing. Appropriate networked entities are connected to act as information sources towards the requesting networked entity.

In some instances, components of network architectures are replaced in order to realize network-level functions of ICN solutions. These modified network architectures allow IP-only endpoints to natively communicate with each other over the INC. Some of the modified network architectures may require transitioning end-user equipment from providing IP-based services to be able to provide ICN-based services. However, it may be burdensome to replace all IP-based endpoints with endpoints configured to realize network-level functions of various ICN solutions. Thus, there is a need for systems and methods to register Fully Qualified Domain Name (FQDN) based IP service endpoints at network attachment points.

SUMMARY

In some of the systems and methods disclosed herein, a network access point in an information-centric network is configured to register, deregister, and update FQDN information for IP service endpoints. One embodiment takes the form of a method comprising: receiving, at a server-side network access point (sNAP) in an information-centric network (ICN), a registration request including a first fully qualified domain name (FQDN), a port, a transport protocol, and a service name of an IP server; publishing, at the sNAP, the port, the transport protocol, and the service name to a first content identifier (CID); and subscribing, at the sNAP, to a second CID that is based on the FQDN.

BRIEF DESCRIPTION OF THE DRAWINGS

FIG. 4 depicts a packet structure for request, acknowledgement, and error messages, in accordance with some embodiments.

FIG. 5A depicts an ICN namespace used to distributed FQDN registration from a sNAP to a cNAP, in accordance with some embodiments.

FIG. 6 depicts a packet structure for a notification packet, in accordance with an embodiment.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Example Networks for Implementation of the Embodiments

Figure 1A:
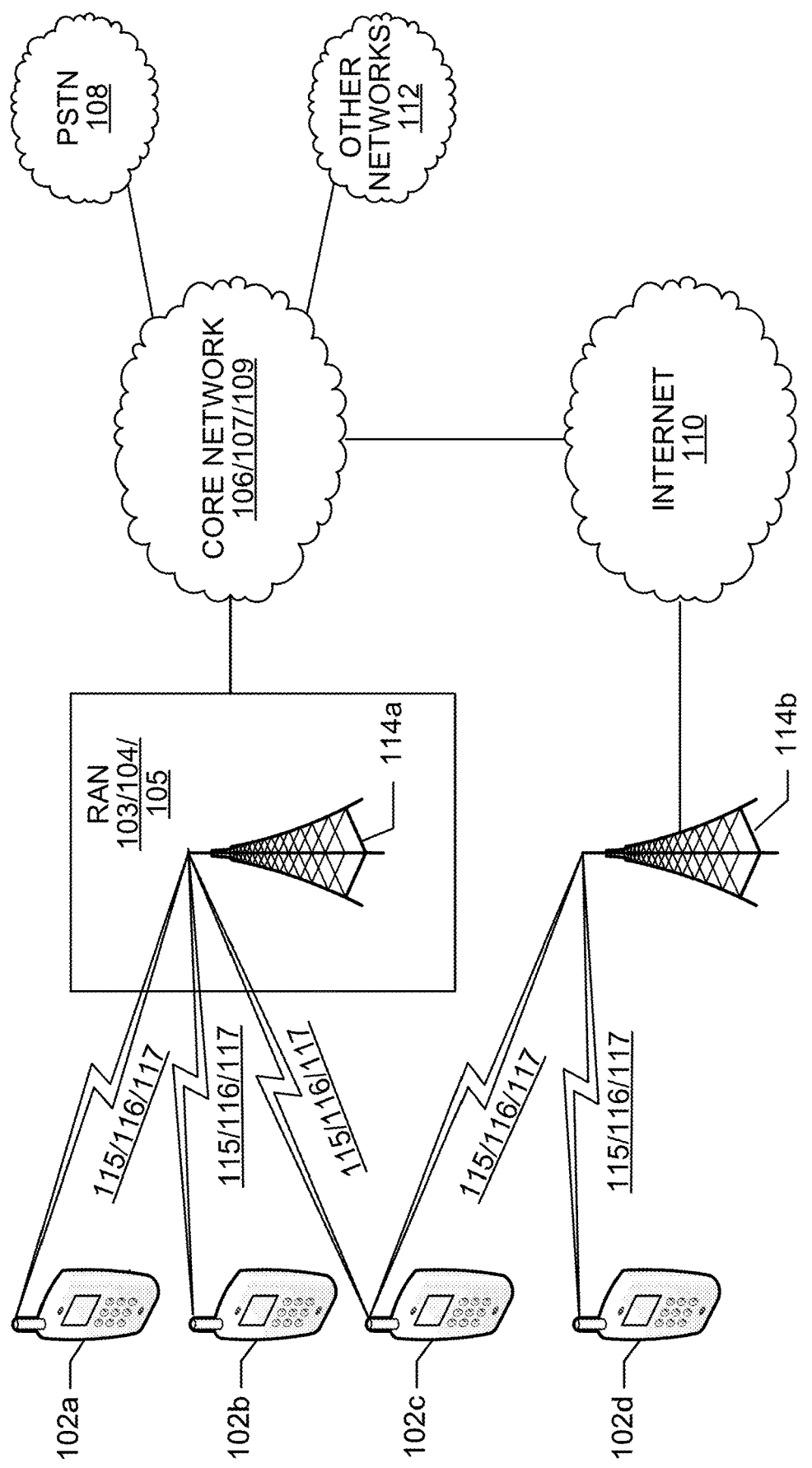
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
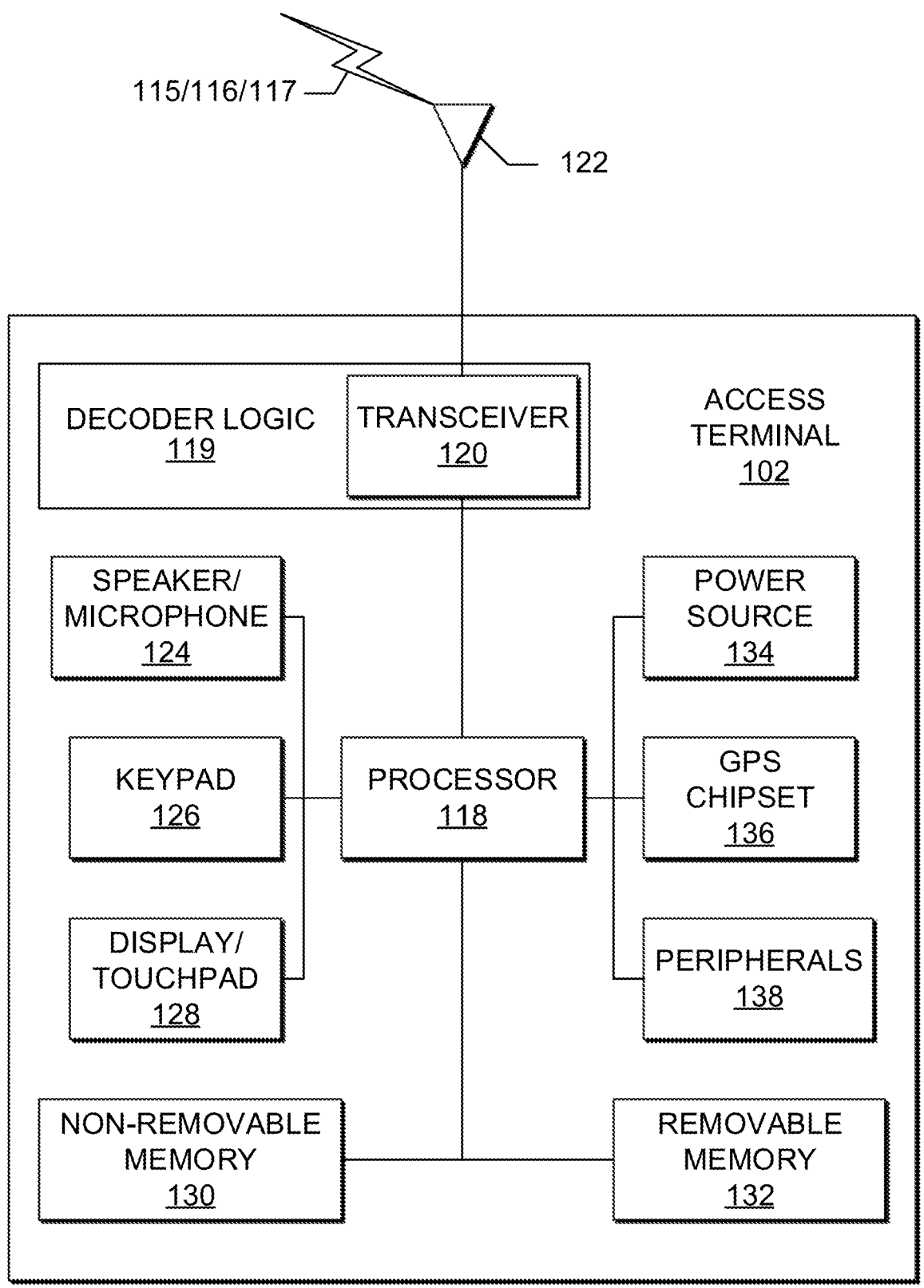
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source

134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A and 1B as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1C:
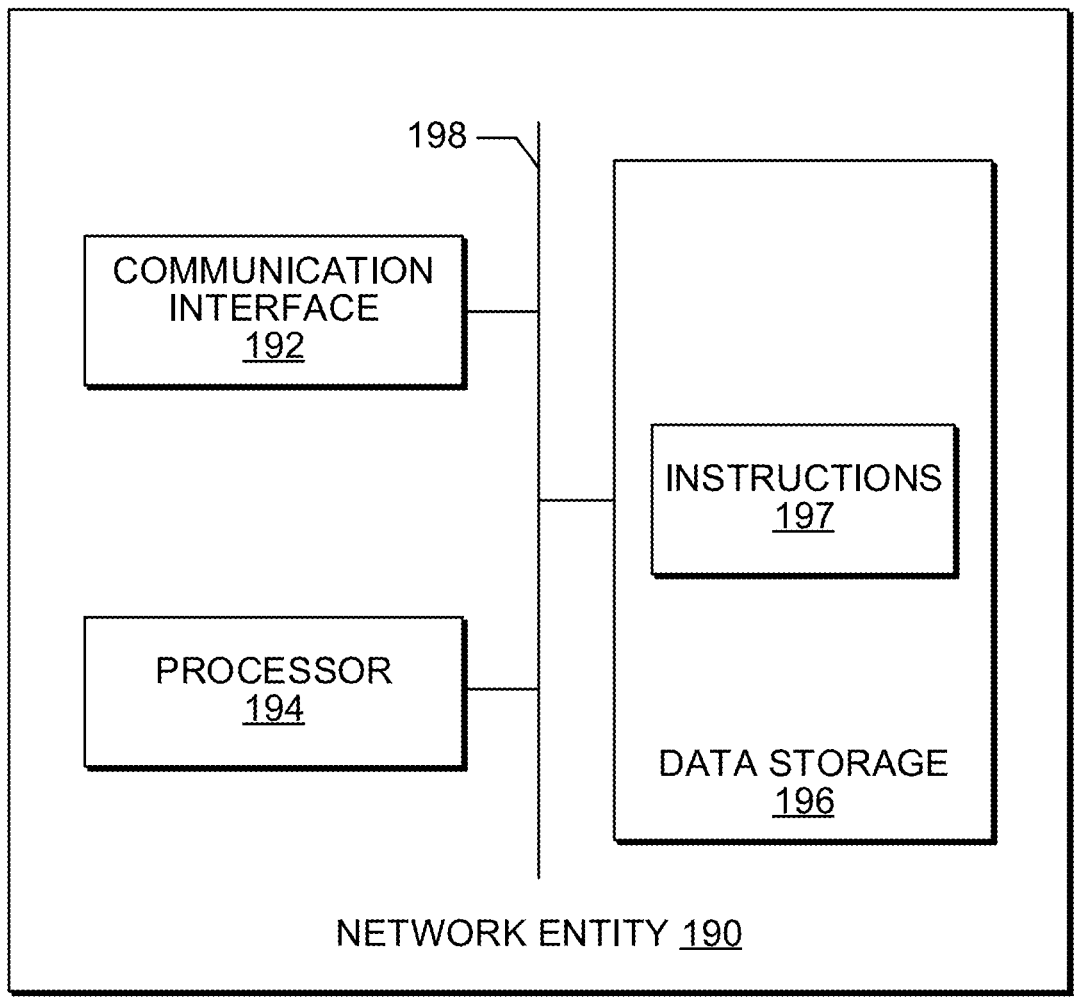
FIG. 1C is a system diagram illustrating an example network entity that may be used within the communication system of FIG. 1A according to an embodiment.

FIG. 1C depicts an example network entity 190 that may be used within the communication system 100 of FIG. 1A. As depicted in FIG. 1A, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1C, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1C. In some embodiments, one or more of such functions are carried out by a set of multiple network entities in combination, where each network entity has a structure similar to that of network entity 190 of FIG. 1C. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP-HA 184, AAA 186, and gateway 188. And certainly other network entities and/or combinations of network entities could be used in various embodiments for carrying out the network-entity functions described herein, as the foregoing list is provided by way of example and not by way of limitation.

Exemplary Embodiments.

Exemplary embodiments disclosed herein may be used in Information-Centric Networks (ICNs) such as those described in International patent application publications WO/2016/168009 "Methods, Apparatus and Systems for Use with Information-Centric Networking (ICN)", WO/2016/123516 "Methods and Systems for Anchoring Hypertext Transfer Protocol (HTTP) Level Services in an Information Centric Network (ICN)", WO/2016/061243 "Anchoring IP Devices In ICN Networks", and WO/2016/033487 "Apparatus For Interfacing Between Information Centric Networks (ICNS) and Internet Protocol (IP) Networks," the complete disclosures of which are hereby incorporated herein by reference.

Information-centric networks (ICNs) may constitute a new networking paradigm in which the routing of packets is decoupled from the relationship between publishers (that have information) and subscribers (that are interested in a particular piece of information). This is achieved by separating the matching of publishers and subscribers and the calculation of the path between a publisher and its subscribers. The matching is performed by a rendezvous (RV) function, which has a list of active publishers and subscribers that respectively publish to and subscribe to a content identifier (CID). A CID is a unique identifier which is composed of a multiple scope identifiers and is used by RV to identify information and to match publishers and subscribers. If such a match has happened, RV requests a path between publishers and subscribers from a topology manager (TM) which has a complete view of the network. Upon the reception of a path calculation TM determines the most appropriate path between publishers and subscribers, e.g. using shortest path.

Figure 2A:
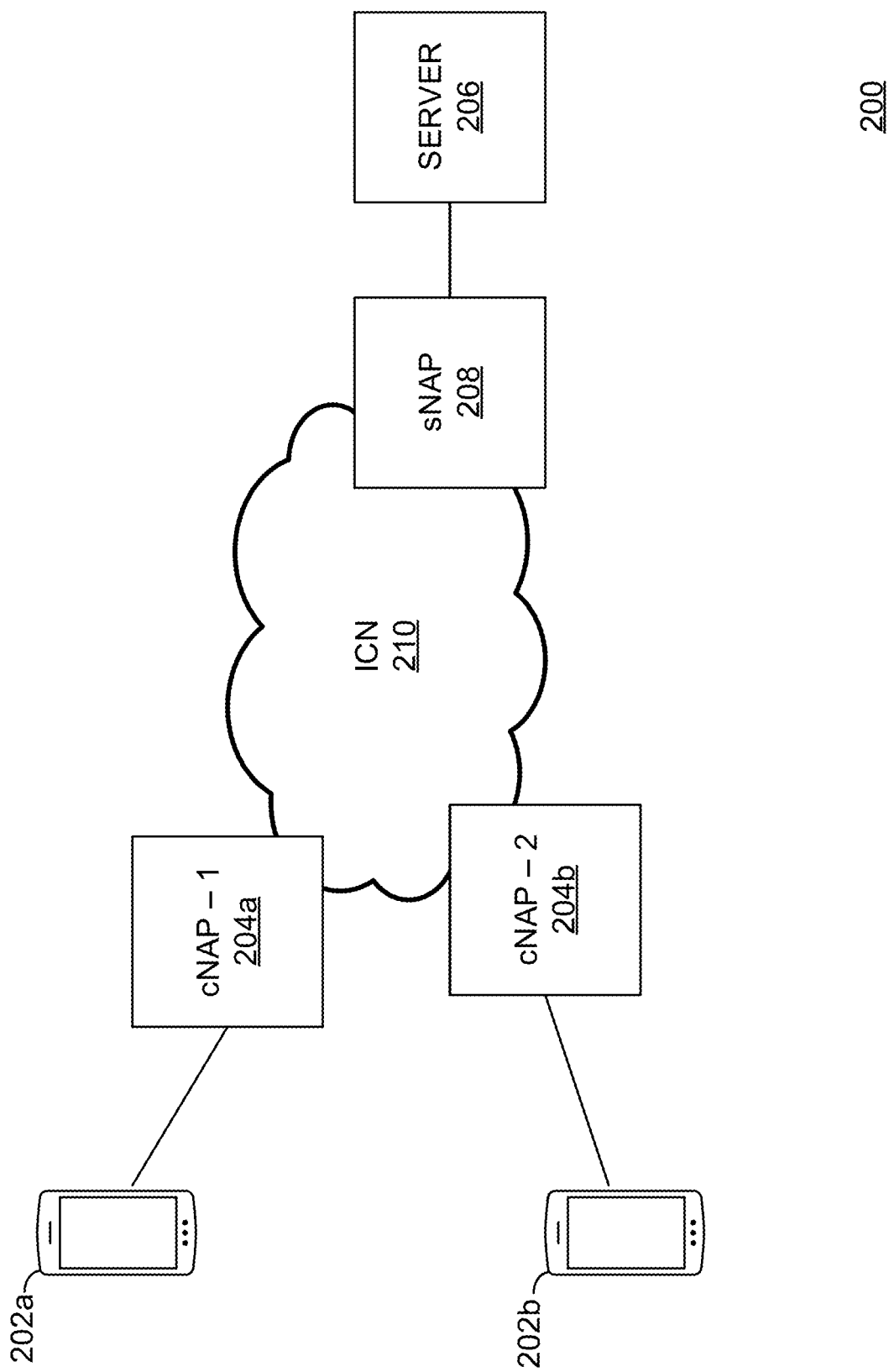
FIG. 2A depicts a basic system model, in accordance with some embodiments.

FIG. 2A depicts a model of an exemplary system, in accordance with an embodiment. In some embodiments, systems similar to those disclosed in FIGS. 1A-1C are modified in order to realize desired network-level functions. Some protocol abstractions, such as IP, HTTP, and IGMP, have been developed to allow devices (such as WTRUs, and IP-Only endpoints) to natively communicate with each other over the system architectures. These protocol abstractions are defined to, for example, leverage the publish-subscribe model to achieve performance gains or simply allow IP-only endpoints to communicate with each other.

FIG. 2A depicts the system 200 and includes a first client device 202a communicatively connected to a client-side Network Access Point (cNAP-1) 204a, a second client device 202b communicatively connected to another client-side Network Access Point (cNAP-2) 204b, and a server 206 communicatively coupled to a server-side Network Access Point (sNAP) 208. The NAPs are all connected to the ICN 210.

In some embodiments, the client devices 202a and 202b may be implemented as WTRUs 102 of FIGS. 1A-1C. In an exemplary embodiment, the client devices are IP-based client devices and may also be referred to as endpoints or endpoint devices herein. The Network Access Points (NAP) (e.g.; cNAP-1 204a, cNAP-2 204b, and sNAP 208) and server 206 may be implemented as instantiations of network entity 190 of FIG. 1C. The NAPs provide an IP network interface towards the IP-enabled devices (client device 202a, client device 202b, and server 206) locally connected to the NAP. For example, the cNAP-1 204a provides an IP network interface towards the client device 202a, the cNAP-2 204b provides an IP network interface towards the client device 202b, and the sNAP 208 provides an IP network interface towards the server 206. In some embodiments, the server 206 is an IP-only web server. In some embodiments, the Network Access Points translate between HTTP and ICN, using a hash of an FQDN as a Content ID. The cNAP serves IP endpoints that issue requests, and the sNAP serves IP endpoints which can provide the content for the FQDN. The sNAP has information about the existence of IP-based IP endpoints serving the FQDN to permit subscription to the FQDN-based namespace. Additionally, the IP address, port, and transport protocol to which the NAP should establish a communication socket is established.

In an exemplary embodiment, to facilitate receiving and handling of HTTP requests from client devices 202a and 202b, the sNAP 208 subscribes to the Content IDs (CID) /http/hash(FQDN), where hash(FQDN) is the result of applying a predetermined hash function to the FQDN. The sNAP 208 receives IP and port number information for a service available on the server 206. For example, the sNAP 208 may receive such information from an entity requesting that the server 206 be registered as serving the FQDN. This requesting entity may be, for example, the server 206 and/or another entity that is authorized to transmit such requests. Each cNAP terminates the transport layer session between the IP endpoint and the ICN network 210 and publishes the HTTP message. The same transparent proxy functionality applies to the sNAP when establishing transport sessions towards the server 206.

In some embodiments, an IP server has a web resource that is meant to be reachable by IP clients via HTTP (and a registered FQDN). A sNAP allows authorized IP endpoints to register, update and unregister to and from particular FQDNs. In some embodiments, in the absence of a secure authentication method (e.g., key-based), statically configured endpoints are permitted to communicate to the NAPs over the interface.

In some embodiments, the NAPs provide an interface to register IP endpoints to serve a FQDN. A FQDN and service name are used to subscribe to a CID to receive data under an ICN namespace The CID may be generated, for example, based on the FQDN and the service name. An IP address and port are used to establish a socket communication on the sNAP. A dedicated ICN namespace is used to convey transport protocol, port, and service name information to the cNAPs. The proxy has information for which port to intercept data from, and the service type provides information to enable the cNAP to apply the appropriate ICN namespace.

Figure 2B:
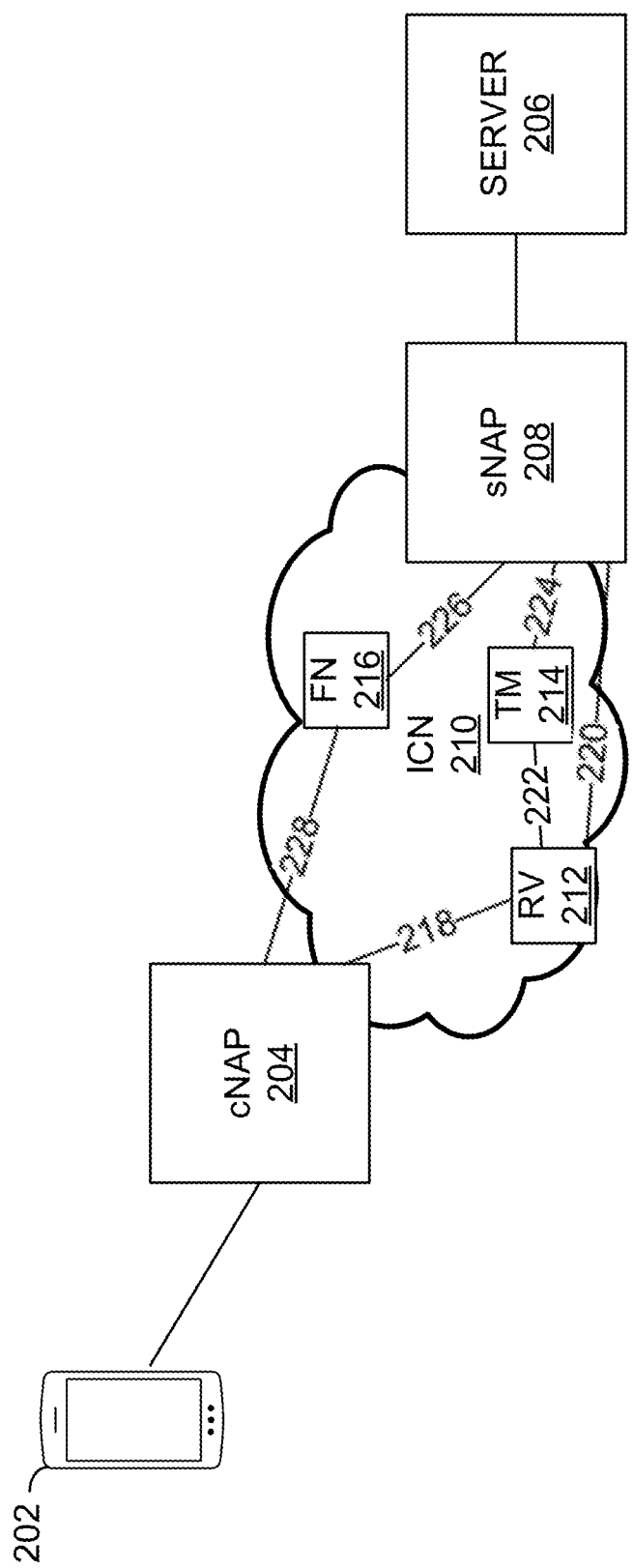
FIG. 2B depicts an example information-centric network (ICN) that may be used within the basic system model depicted in FIG. 2A according to an embodiment

FIG. 2B is a model illustrating the ICN 210 according to an embodiment. The ICN 210 includes a rendezvous (RV) 212, a topology manager (TM) 214, and forwarding (FN) 216. As noted above, the RV 212 matches publishers, which have available information to provide, to subscribers, which have an interest in the available information. For the sake of simplicity, FIG. 2B depicts a scenario in which the sNAP 208 is the publisher and the cNAP 204 is the subscriber. For the cNAP 204 to be a subscriber to an appropriately formed named information item, for example, the cNAP 204 may communicate an interest in the information item to the RV 210 via the ICN cNAP-RV interface 218. For the sNAP 208 to be a publisher to the appropriately named information item, for example, the sNAP 208 may communicate information availability to the RV 212 via the ICN sNAP-RV interface 220. If a scenario in which a suitable match occurs, the RV 212 may instruct the TM 214, via the ICN RV-TM interface 222, to determine suitable path information from the publisher to the subscriber for information exchange. The TM 214 communicates the determined path information to the sNAP 208 via the ICN TM-sNAP interface 224. The sNAP 208 may then publish the information, for example, via the ICN FN interface 226 to the network. The cNAP 204 receiving suitable information, for example via the ICN FN interface 228, may be an indication of successful subscription.

Figure 7:
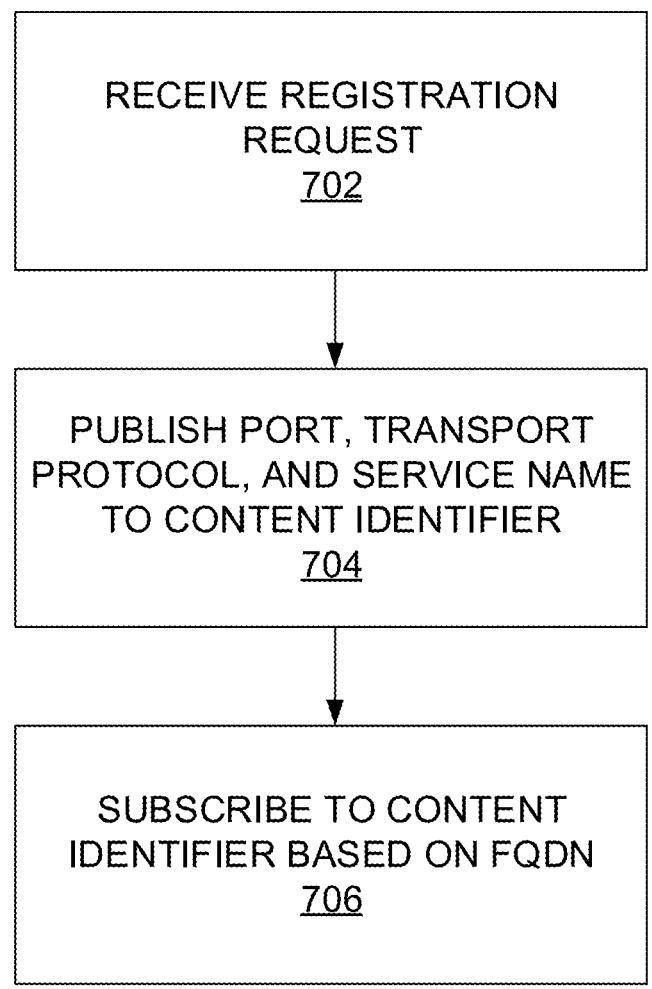
FIG. 7 is a flowchart of an exemplary method according to an embodiment.

FIG. 7 is a flowchart of an exemplary method in accordance with some embodiments. At 702, a registration request is received at a sNAP in an ICN. In an embodiment, the registration request includes a fully qualified domain name (FQDN), a port, a transport protocol, a service name, and an IP address of an IP server. For example, the sNAP 208 may receive a registration request from a requesting entity requesting to register the server 206 to an FQDN. After receiving the registration request, the sNAP may add the FQDN, the port, the transport protocol, the service name, and the IP address of the IP server to a database of the sNAP.

At 704, the sNAP publishes the port, the transport protocol, and the service name received in the registration to a content identifier (CID). In an embodiment, the CID is a dedicated registration namespace of the ICN. For example, the sNAP 208 may publish this information to the CID/management/fqdnRegistration. An example of a dedicated registration namespace is described more fully below with respect to FIG. 5A. In an embodiment, all of the cNAPs in the ICN subscribe to the CID, and the cNAPs that are subscribed to this CID receive the published information. For example, the cNAP 204 may receive the information published by the sNAP 208 as a result of being a subscriber to the CID to which the information is published.

At 706, the sNAP subscribes to a CID that is based on the FQDN. In an embodiment, the CID is /http/hash(FQDN). In an embodiment, the sNAP, via subscription to the CID based on the FQDN, receives an ICN packet including an encapsulated HTTP request directed to the FQDN, and in response, the sNAP transmits the HTTP request to the IP server. The ICN packet may comprise, for example, a header and a payload, and the HTTP request may be the payload of the ICN packet. In an embodiment, the ICN packet is received at the sNAP from a cNAP that serves an IP endpoint that is the original source of the HTTP request. For example, the source of the HTTP request may be the client device 202. After receiving the ICN packet, the sNAP may decapsulate the HTTP request from the ICN packet. The sNAP may inspect the HTTP request to determine the destination of the HTTP request and may transmit the HTTP request to the destination.

In an embodiment, in response to transmitting the HTTP request, the sNAP receives an HTTP response from the server, encapsulates the HTTP response in an ICN packet, and publishes the ICN packet to a CID. The CID may be based on a uniform-resource locator (URL) included in the HTTP request. For example, the CID may be http/hash (URL). The cNAP may be subscribed to the CID (e.g., the CID http/hash(URL)) and may receive the published ICN packet that encapsulates the HTTP response. The cNAP may decapsulate the HTTP response from the ICN packet. The cNAP may inspect the HTTP response to determine the destination of the HTTP response and may transmit the HTTP response to the destination.

Exemplary FQDN Syntax.

In accordance with an embodiment, the FQDN syntax follows syntax rules described in RFC1035. For example, a subdomain is separated from its domain by a period or dot, "."; a domain name can have any of the 52 alphabetic characters (upper and lower case) "a" through "z"; characters are case insensitive; a domain name may include a hyphen, "-", between any of the 52 alphabetic characters, but not as a first and not as a last character, a domain name can have any of the digits "0" through "9"; and the entire FQDN may not be longer than 63 characters.

Exemplary Server-Side Network Attachment Point Data.

In some embodiments, the registration of a server offering IP services uses additional data to support a wider range of services such as HTTP and CoAP. Also, the port on which a cNAP terminates a transport protocol is not only derived from the service name of a particular FQDN registration procedure (e.g., Port 80 for HTTP or Port 5683 for CoAP), but may be set by the requestor through the disclosed registration interface. The data stored at the sNAP may include a FQDN, an IP address, a protocol, a port, and a service name. This data facilitates ICN operations for the sNAP to become the subscriber for data sent to the FQDN and opens the communication channels towards the server, e.g., opening a TCP or UDP socket. Table 1 depicts an example of data that is stored at the sNAP to perform ICN abstraction.

TABLE 1

Data Stored at sNAP

| FQDN | IP Address | Protocol | Port | Service Name |
|---|---|---|---|---|
| cloud.foo.org | 82.144.227.101 | TCP | 80 | HTTP |
| mycloud.foo.org | 82.144.12.202 | TCP | 8080 | HTTP |
| myservice.company.com | 63.234.124.91 | TCP | 80 | HTTP2 |
| service.company.iot | 45.12.23.49 | UDP | 5683 | CoAP |

The example data depicted in Table 1 permits the sNAP to initialize the correct transport layer communication in its transparent proxy (e.g., TCP or UDP) and permits placing incoming packets from the registered IP service endpoint servers to the appropriate ICN handler (e.g., HTTP, HTTP2, or CoAP). In an embodiment, the cNAP implicitly follows IANA's assigned ports following RFC 6335.

Exemplary Registration of New IP Service Endpoint.

In accordance with an embodiment, information used to register a new IP service endpoint that serves a particular FQDN includes the FQDN in a case insensitive manner (as described in RFC 1035, Section 2.3.3), the IP address of the endpoint, the transport protocol used for the service, and the service name. Authorized entities are permitted to use the FQDN registration interface.

Figure 3A:
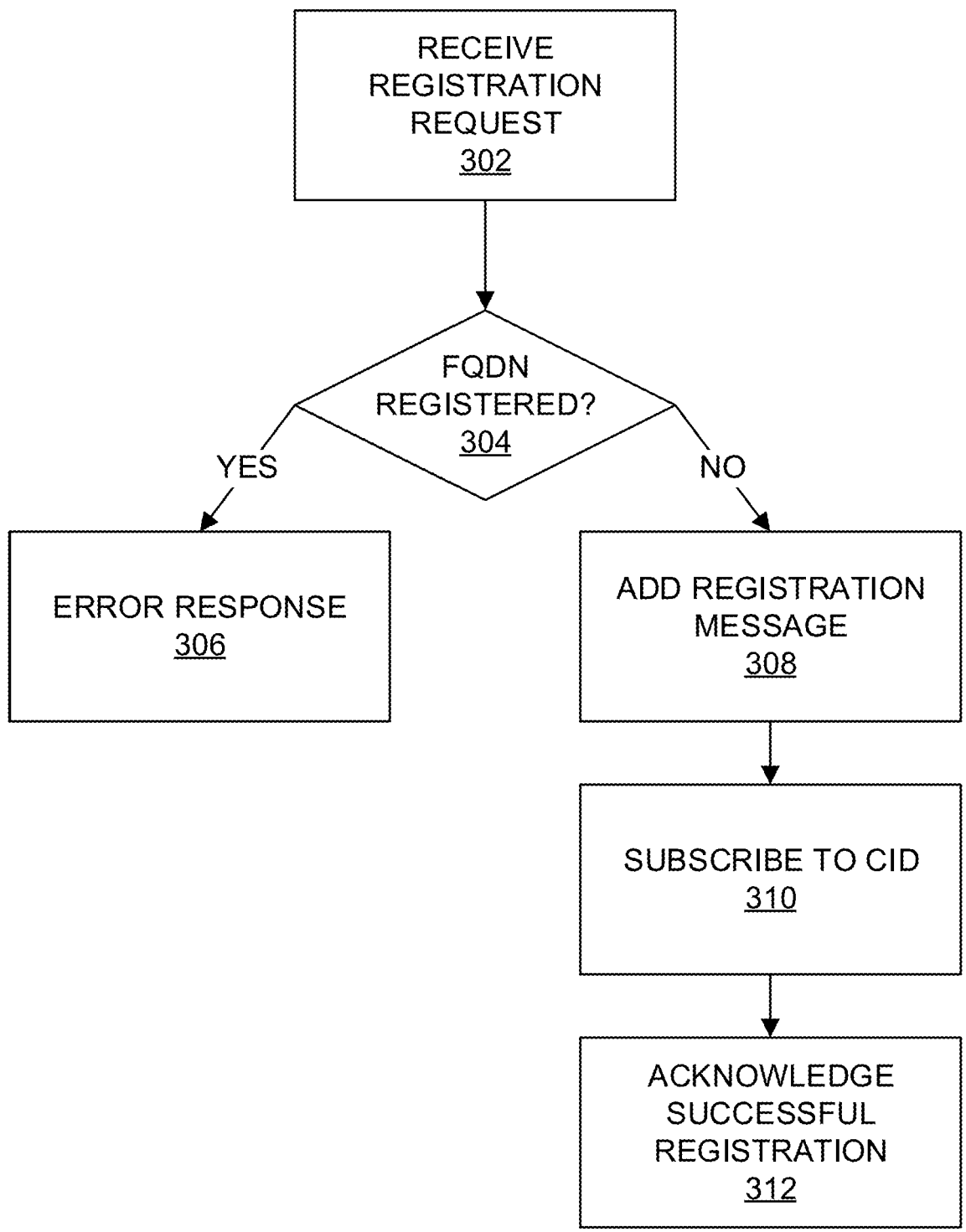
FIG. 3A depicts a method of registration, in accordance with some embodiments.

FIG. 3A depicts a method of registration, in accordance with an embodiment. FIG. 3A depicts the method 300 that includes receiving a registration request at 302, checking if the FQDN is known at 304, an error response at 306, adding registration message at 308, subscribing to the CID at 310, and acknowledging successful registration at 312.

At 302, the registration request is sent by the IP endpoint, such as the server 206 of FIGS. 2A-2B, or an authorized entity. At 304, the sNAP receives the registration request and checks if the FQDN is known. If the FQDN is known, the sNAP responds (at 306) with an error response (error code), indicating that the FQDN entry exists and that data is to be modified or deleted for the FQDN.

If the FQDN is unknown, the sNAP adds (at 308) the registration message into data storage and acknowledges the insertion of the data entry. At 310, the sNAP subscribes to the CID using, e.g., techniques described in WO/2016/123516 "Methods and Systems for Anchoring Hypertext Transfer Protocol (HTTP) Level Services in an Information Centric Network (ICN)," which is incorporated herein by reference. At 312, the sNAP acknowledges the successful registration of the new FQDN by generating a single packet with the request information and status code indicating the registration has been successful. If there is no registration response arriving at the IP server endpoint that desired to register an FQDN to the sNAP, the registration request may be reissued within a pre-defined timeout interval.

Exemplary Updating of an Existing Entry.

In situations where the IP address, the protocol, and/or the service type for a particular FQDN have changed, the IP service endpoint may send an update message to the sNAP which indicates an update to the existing entry. If the FQDN entry is known to the sNAP, the sNAP updates the values stored for this particular FQDN, acknowledges the successful update of the FQDN registration entry by responding to the update request with a positive acknowledgement, and the sNAP terminates existing sessions towards the IP endpoint. If the FQDN entry is unknown to the sNAP, the sNAP responds with an error code indicating that the update was not successful due to the unknown FQDN. The IP endpoint may send a request to unregister a particular FQDN before issuing a new registration request for the intended update request. If the sNAP does not reply within a given timeout, the IP endpoint may reissue the request to update the values of a particular FQDN.

Exemplary Deregistering of an Existing IP Service Endpoint.

Figure 3B:
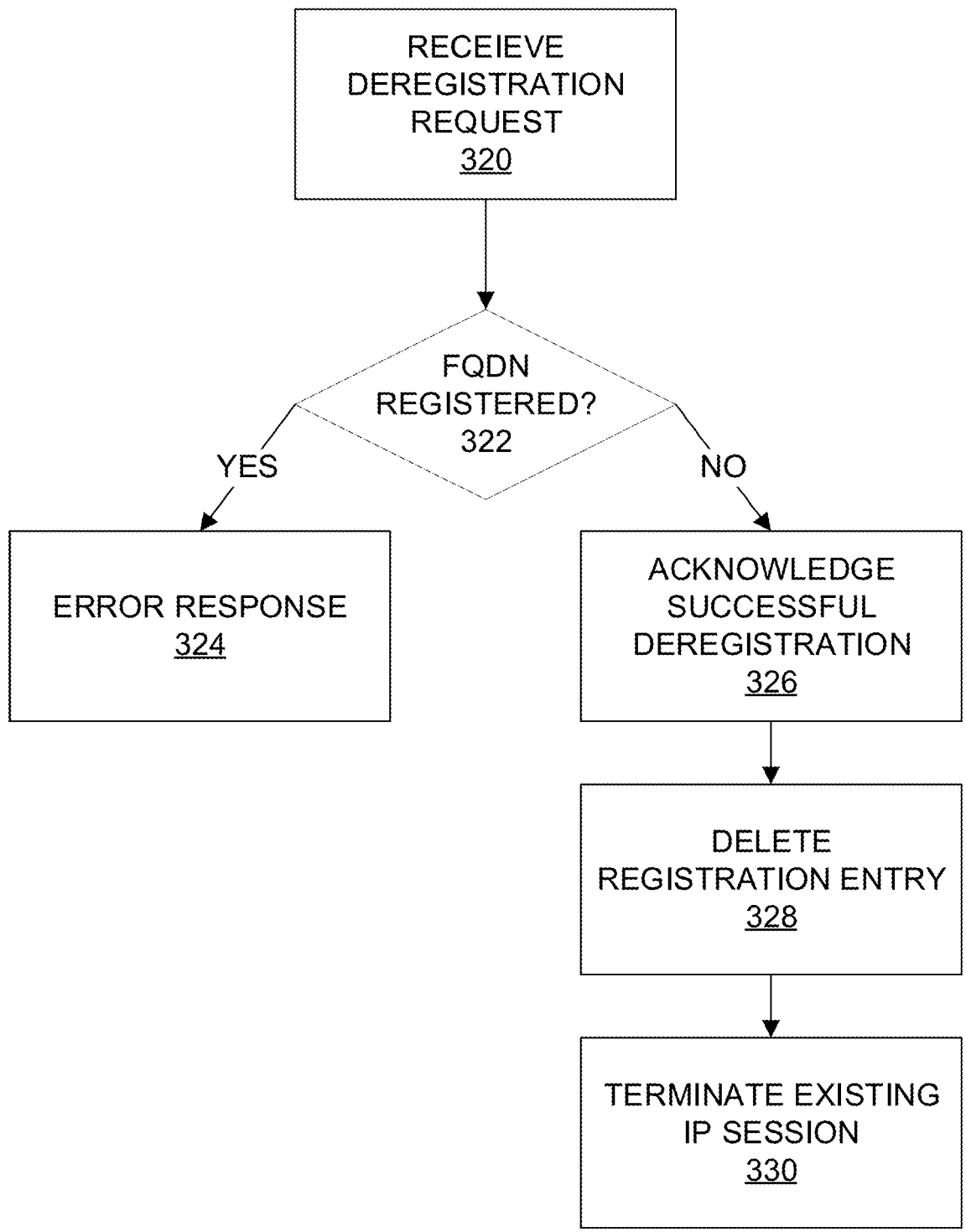
FIG. 3B depicts a method of deregistration, in accordance with some embodiments.

FIG. 3B depicts a method of deregistration, in accordance with some embodiments. In situations where the FQDN is not to be served by the sNAP, the IP endpoint may request to unregister the FQDN from the sNAP by sending (at 320) a request to the sNAP. Such a request may include the FQDN, the transport protocol, and the service name. If the 4-tuple {FQDN, IP address, transport protocol, service name} is registered with the sNAP, the sNAP acknowledges (at 326) the cancellation of a registration of the IP endpoint serving a particular service under the FQDN, the sNAP deletes (at 328) the entry from its data storage, the sNAP terminates (at 330) existing IP sessions towards the IP server, and the sNAP performs ICN operations for affected namespace and FQDN (e.g., unsubscribing from the CID /http/hash(FQDN) for HTTP-over-ICN) using, e.g. techniques described in WO/2016/123516. If the 4-tuple, or a particular value of the 4-tuple, is not registered with the sNAP, the sNAP may respond (at 324) with an appropriate error message back to the requestor.

Exemplary Packet Structure of a Registration or Deregistration at a sNAP.

FIG. 4 depicts a packet structure for request, acknowledgement, and error messages, in accordance with an embodiment. The packet structure allows the IP endpoint to map a response from the sNAP directly to an issued request, for example, in case more than one request (register, update, deregister, or any combination) has been sent to the sNAP. Hence, each message includes a statistically unique identifier generated by the requester (similar to DHCP) and/or the request fields are added to acknowledgement and error messages.

The packet structure 400 of FIG. 4 includes Message Type, FQDN length, FQDN, IP Address, Transport Protocol, Port, and Service Name. The Message Type field of the packet structure 400 may include: REQ_Register, REQ_Update, REQ_Deregister, ACK_Registered, ACK_Updated, ACK_Unregistered, ERR_Register, ERR_Update, or ERR_Deregister. To reach the sNAP, the requesting entity may use an unreliable transport protocol, e.g., UDP or a Layer 2 and 3 broadcast address (e.g., FF:FF:FF:FF:FF:FF and 255.255.255.255, respectively) and an implicitly known unassigned port or an explicitly registered port, which may be subject to standardization (e.g., RFC 6335). A response may be sent to the broadcast address of the zero network (FF:FF:FF:FF:FF:FF and 0.0.0.0) and the source port from which the request was issued from.

Exemplary Distribution of FQDN Registrations to cNAPs.

After an IP endpoint has been registered at a sNAP, the cNAPs receive data to allow their transparent proxies to intercept traffic from the user equipment (UE) targeted at the newly instantiated server. The data includes the transport protocol, the UE with the destination port of the transport protocol, and the provided service name that indicates to the cNAPs which ICN namespace should be applied for any incoming packet.

FIG. 5A depicts an ICN namespace used to distribute FQDN registration information from a sNAP to a cNAP, in accordance with an embodiment. In particular, FIG. 5A depicts the namespace 500 that includes the information item "/fqdnRegistration" under the root scope "/management". Similarly, when an FQDN-based IP endpoint has been unregistered from a sNAP, the cNAPs receive a deregistration notification for the particular protocol and destination port. To receive registration and/or deregistration messages, an NAP subscribes to /management/fqdnRegistration, once fully bootstrapped in order to receive updates from sNAPs about registered and/or unregistered FQDN-based IP endpoints.

Figure 5B:
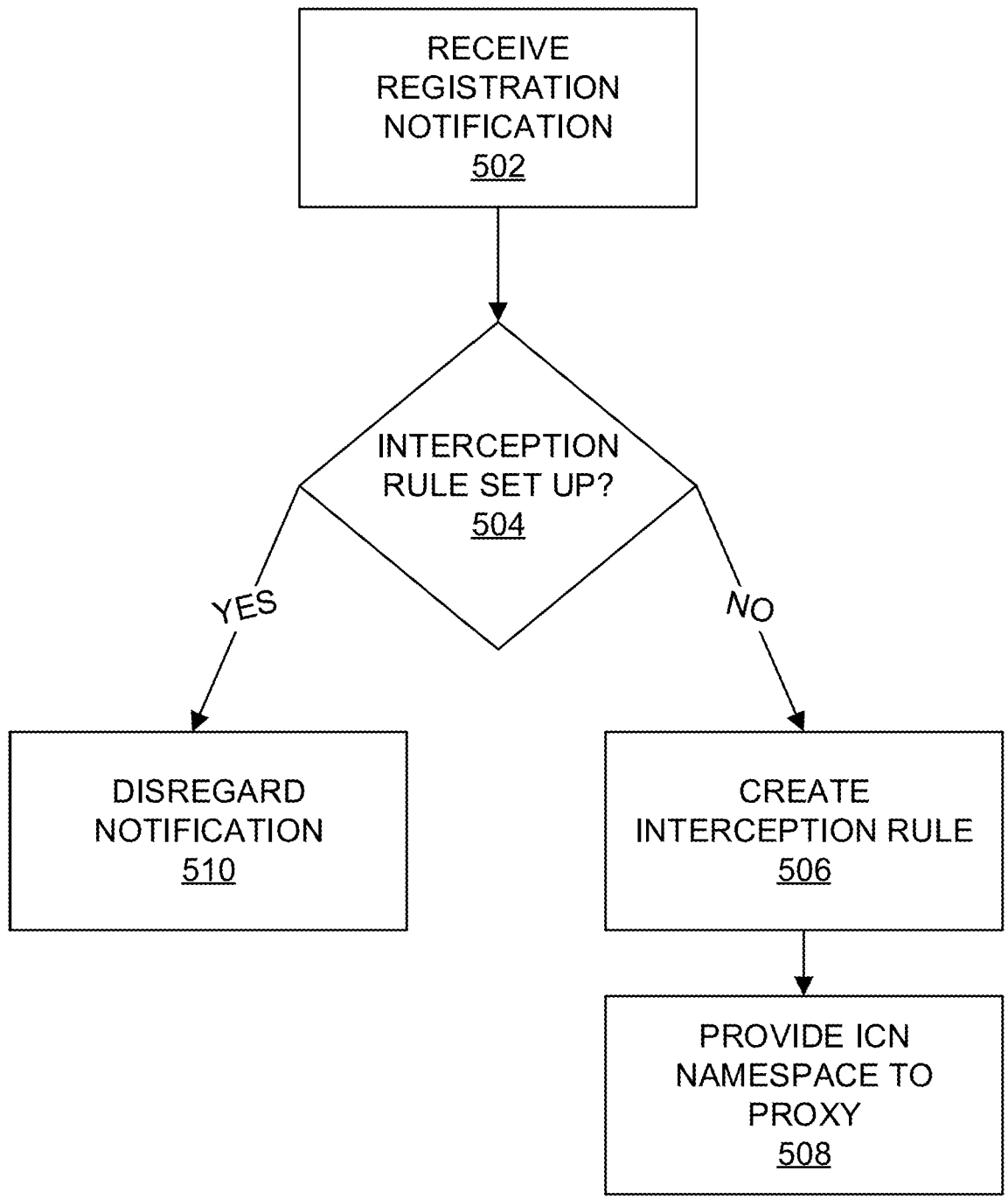
FIG. 5B is a flowchart illustrating an example method carried out by a cNAP according to an embodiment.

FIG. 5B is a flowchart illustrating an example method carried out by a cNAP. At 502, a cNAP receives a registration notification. The registration notification may include a transport protocol and a destination port. At 504, in response to receiving a registration notification, a cNAP checks if its proxy has an interception rule for this pair of transport protocol type and destination port. At 506, if the pair is unknown, the cNAP creates the appropriate interception rules. The interception rules may be a pre-routed entry in the kernel's IP routing table indicating the transparent interception proxy of the ICN namespace to be used when receiving packets. At 510, if the pair is known, the cNAP may ignore and/or discard the registration notification.

Alternatively, the realization of the interception rules may be realized solely within the cNAP without the help of the kernel replicating the routing of IP packets into a particular NAP handler by looking at the tuple source/destination IP address, transport protocol type (e.g., UDP or TCP) and source/destination transport protocol port. A NAP handler defines the actions within the NAP on how to form the CID and how to handle the incoming packet. Furthermore, the CID defines how RV matches publishers and subscribers and which policy TM applies to calculate a path among publishers and subscribers.

Figure 5C:
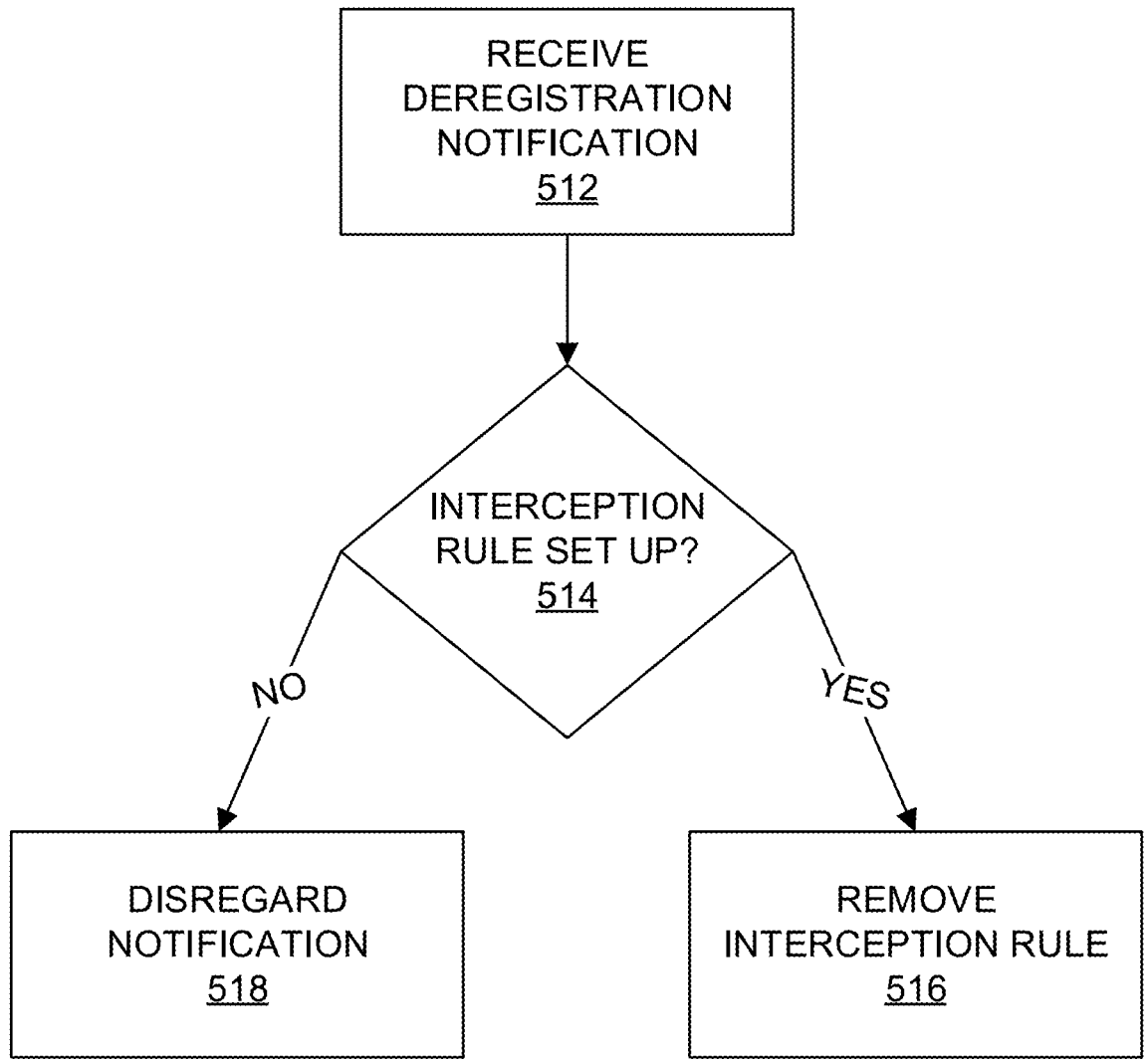
FIG. 5C is a flowchart illustrating an example method carried out by a cNAP according to an embodiment.

FIG. 5C is a flowchart illustrating an example method carried out by a cNAP. At 512, a cNAP receives a deregistration notification. At 514, in response to receiving a deregistration notification, a cNAP checks for an interception rule for the pair of transport protocol type and destination port. At 516, if the pair is known, the cNAP removes the interception rule from its proxy, for example, by deleting the pre-routing entry in the kernel's IP routing table. At 518, if the pair is unknown, the cNAP may ignore and/or discard the deregistration notification.

FIG. 6 depicts a packet structure for a notification packet, in accordance with an embodiment. In particular, FIG. 6 depicts the packet structure 600 that includes a notification type, a transport protocol, a port, and a service name. The notification type permits the sNAP to inform cNAPs whether the notification packet is for a registration or deregistration of an FQDN-based IP service endpoint. The remaining fields (Transport Protocol, Port, and Service Name) are like the fields of the packet 400 described in conjunction with FIG. 4.

Figure 8:
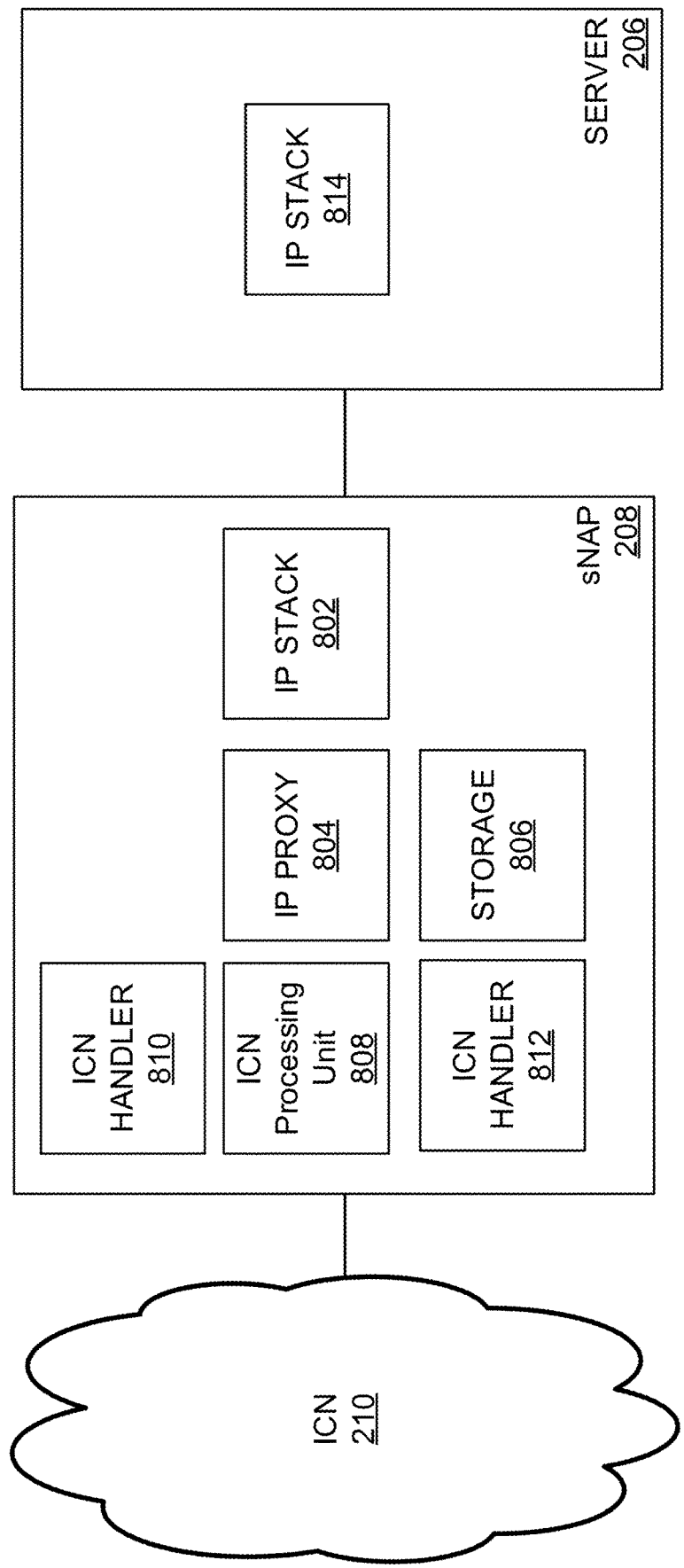
FIG. 8 is a block diagram illustrating an example sNAP according to an embodiment.

FIG. 8 depicts the sNAP 208 according to an embodiment. The sNAP 208 may include an IP stack (e.g., the TCP/IP stack), 802, an IP proxy 804, storage 806, an ICN processing unit 808, and ICN handlers 810 and 812. The sNAP 208 may include an ICN handler for each service the sNAP handles ICN abstraction (e.g., HTTP, CoAP, and/or HTTP2). For example, the ICN handler 810 may be an ICN-HTTP handler and the ICN handler 812 may be an ICN-CoAP handler. Though two ICN handlers are depicted, it will be appreciated that the sNAP may include any number of ICN handlers. The IP stack 802 is a standard IP stack that is modified to include extensions that allow the IP proxy 804 to perform the various proxy functions described herein. For example, the IP stack 802 may be modified to handle the communication of registration, update, and deregistration packets between the sNAP 208 and the requesting entity. The data included in the registration packets may be stored in the storage 806. The ICN processing unit 808 may process the registration, update, and deregistration packets and may provide certain data from these packets to an appropriate ICN handler which may facilitate subscription to a CID associated with the data and/or publication to a registration namespace. The ICN processing unit 808 may process packets received from the server 206 to decide to which ICN handler to provide the packets. The ICN handler provided the packet will encapsulate the packet in an ICN packet and publish the ICN packet to the ICN.

In an exemplary embodiment, a smart TV application (e.g., Netflix) is configured to use netflix.com:8000. A cNAP, which in this example is the functional part of the home router to which the smart TV application is connected, subscribes to the CID/management/fqdnRegistration. The sNAP sits on the ISP core network, where the sNAP sees the local Netflix server. The sNAP alerts the cNAPs (on/management/fqdnRegistration) to store a mapping between port 8000 and CID http/netflix.com. The cNAP intercepts requests for Netflix.com:8000 from the smart TV application and communicates with the sNAP using HTTP-over-ICN to serve the requests. The sNAP interfaces between the ICN network and the IP stack at the ISP core.

In some embodiments, an ICN core network allows IP endpoints to communicate between each other without changes to the standard IP stack via a translation between IP and an ICN namespace at the edge of the ICN core network.

An embodiment takes the form of a method performed by a server-side Network Access Point (sNAP) in an information-centric network (ICN). The method includes receiving a registration request including a Fully Qualified Domain Name (FQDN) and an IP address of an IP server. The method also includes generating a content identifier (CID) based on the FQDN. The method also includes subscribing to the CID on the ICN. In at least one such embodiment, the method further includes, at the sNAP: receiving a first ICN packet including an encapsulated HTTP request directed to the FQDN; and responsively sending the HTTP request to the server at the IP address. In at least one such embodiment, the method further includes, at the sNAP: in response to the HTTP request, receiving an HTTP response from the server; encapsulating the HTTP response in a second ICN packet; and sending the second ICN packet over the ICN.

An embodiment takes the form of a method. The method includes receiving, at a server-side Network Access Point (sNAP) in an ICN, a Fully Qualified Domain Name (FQDN) registration request having a FQDN. The method also includes checking whether the FQDN is already registered. The method also includes in response to the FQDN being already registered, transmitting an error response. The method also includes in response to the FQDN not being already registered: adding the registration request into data storage; subscribing to the content identification (CID) for the ICN; and transmitting an acknowledgement, the acknowledgment indicating a successful FQDN registration. In at least one such embodiment, the FQDN registration comprises a packet having a message type, a FQDN length, a FQDN, an IP address, a transport protocol, a port, and a service name. In at least one such embodiment, the message type is selected from a list of message types, the list of message types consisting of: REQ_Register, REQ_Update, REQ_Deregister, ACK_Registered, ACK_Updated, ACK_Unregistered, ERR_Register, ERR_Update, and ERR_Deregister. In at least one such embodiment, the FQDN registration request is transmitted via a UDP transport protocol. In at least one such embodiment, the sNAP receives the registration request from a client-side NAP (cNAP). In at least one such embodiment, the method also includes: receiving, from an IP service endpoint, and update message indicating an update to an existing FQDN registration; updating the FQDN registration with information from the update message; transmitting, to the IP service endpoint, an update acknowledgment; and terminating a session towards the IP endpoint. In at least one such embodiment, the method also includes: receiving, from an IP endpoint service, a deregistration request having the FQDN, the transport protocol, and the service name; verifying the deregistration request; deleting the FQDN entry from the data storage; and terminating the IP session towards the IP server.

An embodiment takes the form of a method. The method includes transmitting FQDN registration information from a server-side Network Access Point (sNAP) to a client-side Network Access Point (cNAP). In at least one such embodiment, the the cNAP is subscribed to the ICN namespace the sNAP is associated with. In at least one such embodiment, the FQDN registration information comprises a packet having notification type, transport protocol, port, and service name.

An embodiment takes the form of a method. The method includes transmitting FQDN deregistration information from a server-side Network Access Point (sNAP) to a client-side Network Access Point (cNAP). In at least one such embodiment, the cNAP is subscribed to the ICN namespace the sNAP is associated with. In at least one such embodiment, the FQDN deregistration information comprises a packet having notification type, transport protocol, port, and service name.

An embodiment takes the form of a method. The method includes transmitting FQDN update information from a server-side Network Access Point (sNAP) to a client-side Network Access Point (cNAP). In at least one such embodiment, the cNAP is subscribed to the ICN namespace the sNAP is associated with. In at least one embodiment, the FQDN update information comprises a packet having notification type, transport protocol, port, and service name.

An embodiment takes the form of a method. The method includes receiving FQDN registration information from a server-side Network Access Point (sNAP) at a client-side Network Access Point (cNAP). In at least one such embodiment, the cNAP is subscribed to the same ICN namespace as the sNAP. In at least one such embodiment, the FQDN registration information comprises a packet having notification type, transport protocol, port, and service name. In at least one such embodiment, the cNAP creates an interception rule based on the received FDQN registration rule.

An embodiment takes the form of a method. The method includes receiving FQDN deregistration information from a server-side Network Access Point (sNAP) at a client-side Network Access Point (cNAP). In at least one such embodiment, the cNAP is subscribed to the same ICN namespace the sNAP. In at least one embodiment, the FQDN deregistration information comprises a packet having notification type, transport protocol, port, and service name. In at least one such embodiment, the cNAP deletes an interception rule based on the received FQDN deregistration rule.

An embodiment takes the form of a method. The method includes receiving FQDN update information from a server-side Network Access Point (sNAP) to a client-side Network Access Point (cNAP). In at least one such embodiment, the cNAP is subscribed to the same ICN namespace as the sNAP. In at least one such embodiment, the FQDN update information comprises a packet having notification type, transport protocol, port, and service name. In at least one such embodiment, the cNAP updates an interception rule based on the received FDQN update information.

An embodiment takes the form of an apparatus including a server configured to perform steps. The steps include receiving, a Fully Qualified Domain Name (FQDN) registration request having a FQDN. The steps also include checking if the FQDN is already registered. The steps also include in response to the FQDN being already registered, transmitting an error response. The steps also include in response to the FQDN not being already registered: adding the registration request into data storage; and subscribing to the content identification (CID) for the ICN. The steps also include transmitting an acknowledgement, the acknowledgment indicating a successful FQDN registration.

In some of the systems and methods disclosed herein, a network access point in an information-centric network is configured to register, deregister, and update FQDN information for IP service endpoints. One embodiment takes the form of a method comprising: receiving, at a server-side Network Access Point (sNAP) in an ICN, a Fully Qualified Domain Name (FQDN) registration request having a FQDN; checking whether the FQDN is already registered; in response to the FQDN being already registered, transmitting an error response; and in response to the FQDN not being already registered: adding the registration request into data storage, subscribing to the content identification (CID) for the ICN, and transmitting an acknowledgement, where the acknowledgment indicates a successful FQDN registration.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving, at a server-side network access point (sNAP) in an information-centric network (ICN), a registration request including a first fully qualified domain name (FQDN), a port, a transport protocol, and a service name of an IP server;
publishing, at the sNAP, the port, the transport protocol, and the service name to a first content identifier (CID), wherein the first content identifier is a dedicated registration namespace of the ICN; and
subscribing, at the sNAP, to a second CID that is based on the FQDN,
wherein the first CID and the second CID are used to match respectively the sNAP and a client-side network access point (cNAP), and to calculate respectively a first path among the sNAP and the cNAP and a second path among the sNAP and a second cNAP.

2. The method of claim 1, further comprising:
generating, at the sNAP, a feedback message indicating a successful registration; and
outputting, from the sNAP, the feedback message.

3. The method of claim 2, wherein outputting, from the sNAP, the feedback message comprises broadcasting the feedback message.

4. The method of claim 1, further comprising transmitting, from the sNAP to the client-side network access point (cNAP) in the ICN, the port, the transport protocol, and the service name.

5. The method of claim 4, wherein the cNAP is subscribed to the first content identifier.

6. The method of claim 1, wherein the registration request further includes an IP address of the IP server.

7. The method of claim 6, further comprising:
transmitting, from the sNAP, the IP address and the FQDN to a domain name service (DNS) server associated with the ICN.

8. The method of claim 6, further comprising adding the FQDN, the port, the transport protocol, the service name, and the IP address of the IP server to a database of the sNAP.

9. The method of claim 1, further comprising:
receiving, at the sNAP, a deregistration request including the FQDN, the transport protocol, and the service name;
verifying, at the sNAP, the deregistration request;
deleting, at the sNAP, a database entry associated with the deregistration request; and
terminating an existing IP session towards the IP server.

10. The method of claim 1, further comprising:
receiving, at the sNAP, a second registration request including the FQDN;
checking whether the FQDN is already registered; and
in response to the FQDN being already registered, transmitting, from the sNAP, a registration error response.

11. The method of claim 1, further comprising:
receiving, at the sNAP via the subscription to the second content identifier, a first ICN packet encapsulating an HTTP request directed to the FQDN; and
responsively transmitting, from the sNAP to the IP server, the HTTP request.

12. The method of claim 11, further comprising:
in response to transmitting the HTTP request to the IP server, receiving, at the sNAP, an HTTP response from the IP server;
encapsulating, at the sNAP, the HTTP response in a second ICN packet; and
publishing, at the sNAP, the second ICN packet to a third CID.

13. The method of claim 1, further comprising:
receiving, at the sNAP, an update message indicating an update to an existing FQDN registration corresponding to the IP server;
updating, at the sNAP, the existing FQDN registration based on the update message;
transmitting, from the sNAP, an update acknowledgment message; and
terminating a session towards the IP server.

14. The method of claim 1, further comprising establishing a communication socket between the sNAP and the IP server based on the port.

15. A server-side network access point (sNAP) for an information-centric network (ICN) comprising:
a processor; and
a computer-readable storage medium storing instructions operative, when executed by the processor, to cause the processor to:
receive, at a server-side network access point (sNAP) in an information-centric network (ICN), a registration request including a first fully qualified domain name (FQDN), a port, a transport protocol, and a service name of an IP server;
publish, at the sNAP, the port, the transport protocol, and the service name to a first content identifier (CID),
wherein the first content identifier is a dedicated registration namespace of the ICN; and
subscribe, at the sNAP, to a second CID that is based on the FQDN,
wherein the first CID and the second CID are used to match respectively the sNAP and a client-side network access point (cNAP), and to calculate respectively a first path among the sNAP and the cNAP and a second path among the sNAP and a second cNAP.

16. The sNAP of claim 15, wherein the registration request further includes an IP address of the IP server.

17. The sNAP of claim 16, wherein the functions further comprise:
transmitting, from the sNAP, the IP address and the FQDN to a domain name service (DNS) server associated with the ICN.

18. The sNAP of claim 16, wherein the functions further comprise adding the FQDN, the port, the transport protocol, the service name, and the IP address of the IP server to a database of the sNAP.

* * * * *